United States Patent
Busch et al.

(10) Patent No.: US 9,046,891 B2
(45) Date of Patent: Jun. 2, 2015

(54) CONTROL EFFECTOR HEALTH CAPABILITIES DETERMINATION REASONING SYSTEM AND METHOD

(75) Inventors: Darryl Busch, Eden Prairie, MN (US); Raj Mohan Bharadwaj, Maple Grove, MN (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 678 days.

(21) Appl. No.: 13/211,019

(22) Filed: Aug. 16, 2011

(65) Prior Publication Data
US 2012/0101777 A1    Apr. 26, 2012

Related U.S. Application Data

(60) Provisional application No. 61/406,020, filed on Oct. 22, 2010.

(51) Int. Cl.
*G06F 11/00* (2006.01)
*G05B 23/02* (2006.01)

(52) U.S. Cl.
CPC ........ *G05B 23/0278* (2013.01); *G05B 23/0256* (2013.01)

(58) Field of Classification Search
CPC ....... G06F 11/00; G06F 11/008; G06F 11/07; G06F 11/0793; G06F 11/277; G06F 11/30; G06F 2201/86; G05B 19/418; G05B 23/0235
USPC ............. 702/183, 81, 84, 108, 116, 127, 182, 702/185, 189; 700/28–29; 701/29.1–29.2, 701/30.2, 31.4, 31.6–31.9, 32.8–32.9, 33.5, 701/33.8, 34.1, 34.4; 706/45–47, 51–54; 714/25, 37, 46, 47.1–47.3, 48, 799
See application file for complete search history.

(56) References Cited

U.S. PATENT DOCUMENTS

| | | | |
|---|---|---|---|
| 4,646,227 | A | 2/1987 | Corbin et al. |
| 6,389,335 | B1 | 5/2002 | Vos |
| 6,615,090 | B1 | 9/2003 | Blevins et al. |

(Continued)

FOREIGN PATENT DOCUMENTS

| | | |
|---|---|---|
| EP | 2148257 A2 | 1/2010 |
| WO | 2008/157491 A1 | 12/2008 |
| WO | 2010/019798 A2 | 2/2010 |

OTHER PUBLICATIONS

European search report for application No. 11 178 033.4, dated Sep. 13, 2012.

(Continued)

*Primary Examiner* — Toan Le
(74) *Attorney, Agent, or Firm* — Ingrassia Fisher & Lorenz, P.C.

(57) ABSTRACT

A system and method for determining the response capabilities of a control effector are provided. Command data and sensor data associated with the control effector are processed to generate control effector health data representative of control effector health. The control effector health data are processed in a reasoned. The reasoned is configure to selectively indict and clear one or more faults, determine one or more failures that cause indicted faults, and determine, based on the one or more determined failures, a usable range of control effector commands to which the control effector can respond.

10 Claims, 8 Drawing Sheets

(56) References Cited

U.S. PATENT DOCUMENTS

| | | |
|---|---|---|
| 6,636,786 B2 | 10/2003 | Partel |
| 6,654,910 B1 | 11/2003 | Eibach et al. |
| 6,735,549 B2 | 5/2004 | Ridolfo |
| 6,748,304 B2 | 6/2004 | Felke et al. |
| 6,751,536 B1 | 6/2004 | Kipersztok et al. |
| 6,892,127 B2 | 5/2005 | Wiseman |
| 6,983,207 B2 | 1/2006 | Gotou et al. |
| 6,993,421 B2 | 1/2006 | Pillar et al. |
| 7,009,535 B2 | 3/2006 | Kanekawa et al. |
| 7,298,152 B1 | 11/2007 | Wilke et al. |
| 7,328,128 B2 | 2/2008 | Bonanni et al. |
| 7,337,086 B2 | 2/2008 | Guralnik et al. |
| 7,359,777 B2 | 4/2008 | Betters et al. |
| 7,689,383 B2 | 3/2010 | Black et al. |
| 7,742,854 B2 | 6/2010 | Fussell et al. |
| 2003/0127569 A1 | 7/2003 | Bacon et al. |
| 2003/0167111 A1 | 9/2003 | Kipersztok et al. |
| 2003/0195680 A1 | 10/2003 | Pillar |
| 2004/0199360 A1 | 10/2004 | Friman et al. |
| 2005/0154823 A1 | 7/2005 | Bruner et al. |
| 2005/0209767 A1 | 9/2005 | Kim et al. |
| 2006/0036402 A1 | 2/2006 | Deller et al. |
| 2006/0043242 A1 | 3/2006 | Benson et al. |
| 2006/0047403 A1 | 3/2006 | Volponi et al. |
| 2006/0126608 A1 | 6/2006 | Pereira et al. |
| 2006/0271255 A1 | 11/2006 | Stott et al. |
| 2007/0050104 A1 | 3/2007 | Wallace et al. |
| 2007/0093946 A1 | 4/2007 | Gideoni |
| 2007/0198215 A1 | 8/2007 | Bonanni et al. |
| 2007/0198225 A1 | 8/2007 | Roach et al. |
| 2007/0260374 A1 | 11/2007 | Morrison et al. |
| 2008/0039993 A1 | 2/2008 | Cleary et al. |
| 2008/0040152 A1 | 2/2008 | Vian et al. |
| 2008/0091383 A1 | 4/2008 | Ueno |
| 2008/0136677 A1 | 6/2008 | Clark et al. |
| 2008/0270066 A1 | 10/2008 | Blaser et al. |
| 2008/0312783 A1 | 12/2008 | Mansouri et al. |
| 2009/0138141 A1 * | 5/2009 | Nwadiogbu et al. ............ 701/3 |
| 2009/0266150 A1 | 10/2009 | Novis |
| 2009/0281683 A1 | 11/2009 | Self et al. |
| 2010/0023301 A1 * | 1/2010 | Bharadwaj et al. ............ 702/183 |

OTHER PUBLICATIONS

Erdinc et al., "The Problem of Test Latency in Machine Diagnosis . . . ", Part A: Systems and Humans, Jan. 2008, vol. 38 Issue 1.

IEEE Std 1232-2002, IEEE Standard for Artificial Intelligence Exchange and Service Tie to All Test Environments (AI-ESTATE).

Liao, F. et al.; LMI-Based Reliable Robust Tracking Control Against Actuator Faults with Application to Flight Control; School of Electrical and Electronic Engineering; Proceedings of the 39th IEEE Conference on Decision and Control, Sydney, Australia, Dec. 2000.

Lin, C. et al.; Failure Detection and Adaptive Compensation for Fault Tolerable Flight Control Systems; IEEE Transactions on Industrial Informatics, vol. 3, No. 4, Nov. 2007.

Bodson, M. et al.; Multivariable Adaptive Algorithms for Reconfigurable Flight Control; IEEE Transactions on Control Systems Technology, vol. 5, No. 2, Mar. 1997.

EP Search report, EP 11178033.4-2206 dated Feb. 13, 2012.

European Patent Office, European Office Action for Application No. 11 178 033.4 dated Oct. 1, 2012.

* cited by examiner

CONTROL EFFECTOR HEALTH CAPABILITIES DETERMINATION REASONING SYSTEM AND METHOD

PRIORITY CLAIM

This application claims the benefit of U.S. U.S. Provisional Application No. 61/406,020, filed Oct. 22, 2010, the entirety of which is hereby incorporated by reference.

STATEMENT REGARDING FEDERALLY SPONSORED RESEARCH OR DEVELOPMENT

This invention was made with Government support under FA865008-D07803 awarded by the Air Force Research Laboratory (AFRL). The Government has certain rights in this invention.

TECHNICAL FIELD

The present invention generally relates to health management and, more particularly, to a system and method of determining the lost and/or remaining functional capabilities of a control effector using various health-related data.

BACKGROUND

Various systems, such as various types of vehicles and the systems and subsystems that comprise the vehicles, may be subject to potentially severe environmental conditions, shock, vibration, and normal component wear. These conditions, as well as others, may have deleterious effects on vehicle operability. These deleterious effects, if experienced during operation, could leave little time for corrective actions. Hence, most notably in the context of vehicles, health monitoring/management systems are increasingly being used. Vehicle health monitoring/management systems monitor various health-related characteristics of the vehicle. Such operational health characteristics may, in some instances, be further decomposed to the health characteristics of major operational systems and subsystems of the vehicle.

In addition to monitoring vehicle health status, it would be desirable to determine the potential effect that a potentially degraded system, subsystem, or component may have on the overall capabilities of the vehicle, and supply information of these potential effects so that a system may, if needed, reconfigure itself to accommodate such a degraded system, subsystem, or component. For example, if an aerodynamic surface actuator fails or degrades during flight, flight controls may reallocate control to other surfaces. If a fault degrades the aerodynamics to a point where the vehicle will be unable to successfully complete its mission, mitigating actions (such as abort or re-plan) may be needed to minimize the impact of the fault. Heretofore, such capabilities have not been implemented with adequate precision and/or without undue complexity.

In a vehicle with power, weight, and size constraints, the onboard health monitors are often insufficient to fully isolate faults due to the complexities of the vehicle. What is needed is a health management system and method that accurately determines the lost/remaining functional capabilities of a vehicle and interfaces to the control system, and that does not rely on fully isolating a fault.

BRIEF SUMMARY

In one embodiment, a method for determining the response capabilities of a control effector includes processing at least command data and sensor data associated with the control effector to generate control effector health data representative of control effector health. The control effector health data are processed in a reasoner to selectively indict and clear one or more faults, determine one or more failures that cause indicted faults, and determine, based on the one or more determined failures, a usable range of control effector commands to which the control effector can respond.

In another embodiment, a system for determining the response capabilities of a control effector includes a test module and a reasoner. The test module is adapted to receive at least command data and sensor data associated with an control effector, and is configured, upon receipt of these data, to generate control effector health data representative of control effector health. The reasoner is coupled to receive the control effector health data and is configured, in response thereto, to selectively indict and clear one or more faults, determine one or more failures that are caused by indicted faults, and determine, based on the one or more determined failures, a usable range of control effector commands to which the control effector can respond.

Furthermore, other desirable features and characteristics of the control effector health capabilities determination reasoning system and method will become apparent from the subsequent detailed description, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
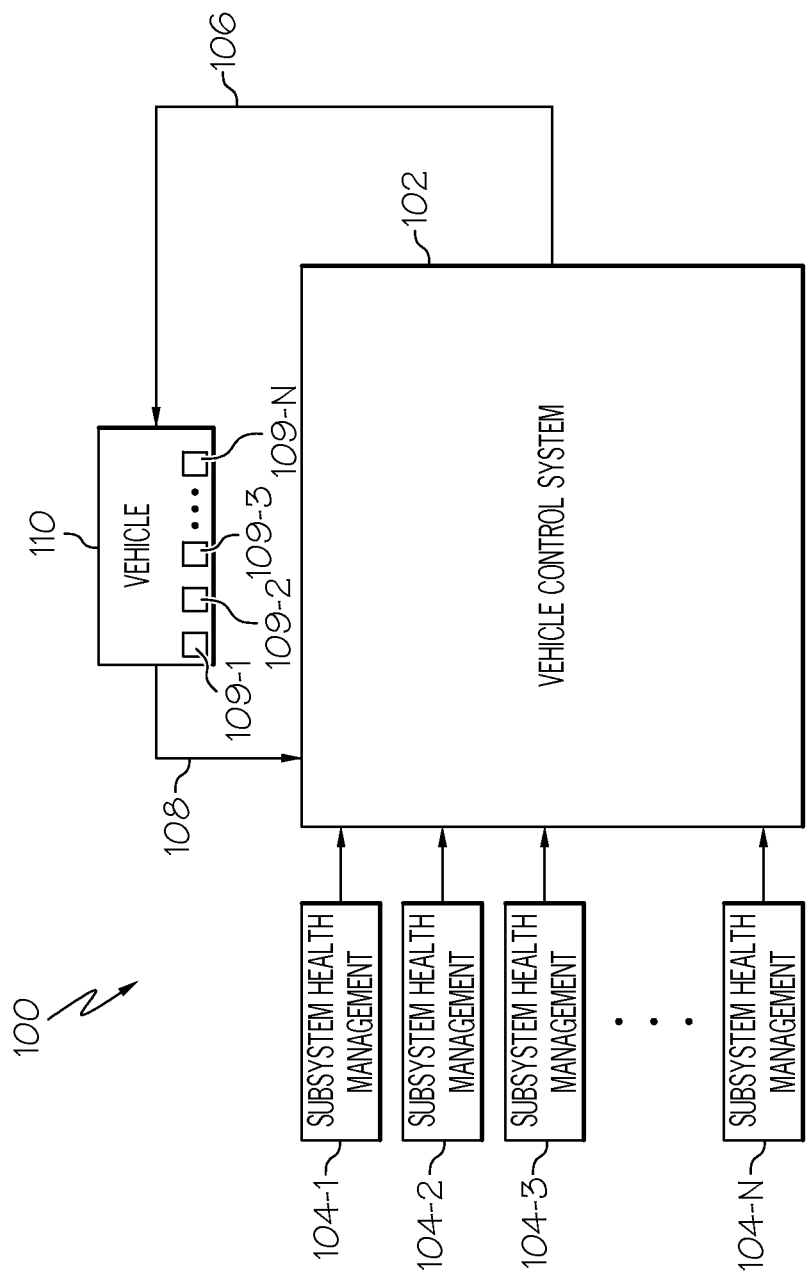
FIG. 1 depicts a functional block diagram of an embodiment of an example vehicle guidance and control system.

A functional block diagram of an embodiment of a vehicle guidance and control system 100 is depicted in FIG. 1, and includes a vehicle control system 102 and one or more subsystem health management systems 104 (e.g., 104-1, 104-2, 104-3, . . . 104-N). The vehicle control system 102 implements at least one or more adaptive control laws that generate and supply various commands 106 to various components 109 in or on, for example, a vehicle 110. The components may vary, but include at least a plurality of control effectors (e.g., 109-1, 109-2, 109-3 . . . 109-N) that are configured to control, for example, the position of one or more devices.

The vehicle control system 102 also receives feedback 108 from, for example, various sensors in or on the vehicle 110, and data 112 from the one or more subsystem health management systems 104. The one or more control laws in the vehicle control system 102 are adaptive control laws, in that the control laws adaptively respond to the data supplied from the one or more subsystem health management systems 104. A typical response of the adaptive control law implemented in the vehicle control system 102 is to limit further commands to the effector to its reduced usable range, and to make more use of other effectors as necessary to maintain control. Further response could include changing the envelope of operation of the vehicle and changing the mission plan. The adaptive control laws may be implemented using any one of numerous known adaptive control law schemes generally known in the art.

Figure 2:
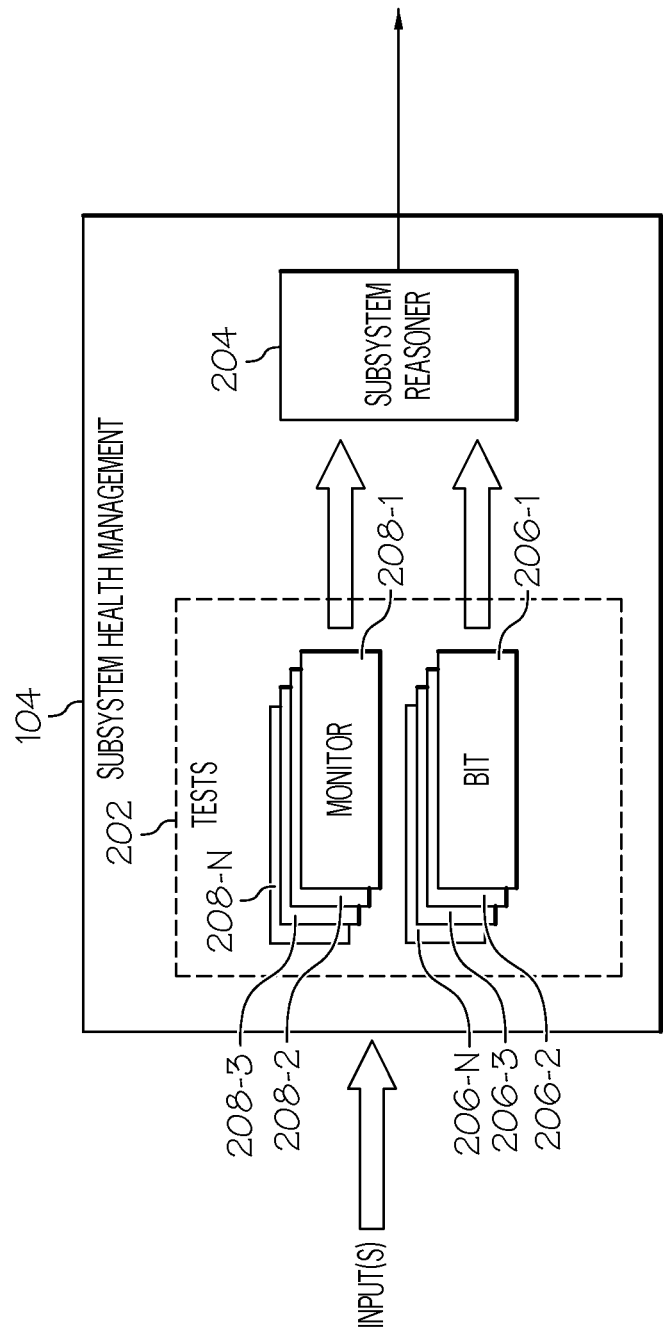
FIG. 2 depicts a functional block diagram of an exemplary embodiment of a subsystem health management system that may be used in the system of FIG. 1.

One or more of the subsystem health management systems 104 are coupled to receive various inputs, such as at least a portion of the commands 106 and feedback 108 supplied to the vehicle control system 102 and/or sensors dedicated to health monitoring. These one or more subsystem health management systems 104 are additionally configured, based in part on these inputs, to detect, isolate, and quantify various faults, failures and degradations that may occur within the associated subsystem, and to supply data representative thereof to the adaptive control laws in the vehicle control system 102. To provide the most accurate information to the vehicle control system 102, the subsystem health management systems 104 are configured to report not only full functional failures, but also parametric degradations of capabilities. Thus, these subsystem health management systems 104 are configured to handle various diagnostic complexities including, but not limited to, ambiguity, latency, false negatives and false alarms. Referring now to FIG. 2, a functional block diagram of an exemplary embodiment of a subsystem health management system 104 is depicted, and will now be described.

The exemplary subsystem health management system 104 includes a tests module 202 and a subsystem reasoner 204. The tests module 202 is coupled to receive at least command data and sensor data associated with one or more of the control effectors 109, and is configured, upon receipt of these data, to generate control effector health data representative of control effector health. In a particular embodiment, the tests module 202 is configured to continuously or intermittently implement various tests and/or measurements on the associated subsystem (e.g., control effector), and to generate health data representative of subsystem health (e.g., good health/bad health). The health data are then supplied to the subsystem reasoner 204. The health data generated and supplied by the tests module 202 may vary and may include, for example, PASS/FAIL data to indicate a component or portion of the subsystem is healthy/unhealthy. The health data may additionally include data that indicate specific conditions were not right to perform the test, such as returning the result NOT_AVAILABLE or remaining silent. Some tests may have two or more failure criteria. For such tests, the health data may include qualified FAIL data such as, for example, PASS/ FAIL-HI/FAIL-LO, etc. As may be appreciated, different failure criteria may lead to different failure conclusions.

It will be appreciated that the tests module 202 may be variously configured to implement its functionality. In the depicted embodiment, however, the tests module 202 implements its function using one or more built-in test module 206 (e.g., 206-1, 206-2, 206-3, . . . 206-N) and one or more monitor module 208 (208-1, 208-2, 208-3, . . . 208-N). A built-in test (BIT) module 206, as is generally known, is configured to implement one or test procedures on a subsystem and/or component to determine whether the subsystem and/or component is functioning properly.

The monitor modules 208 (which may also be referred to herein as parametric limit monitor modules) are configured to receive various data representative of one or more subsystem parameters and determine whether a subsystem and/or component that is not tested by a BIT module 206 (or is perhaps not adequately tested by a BIT module 206) is functioning properly. Moreover, one or more of the monitor modules 208 are additionally configured to supply data representative of the degree of degradation. In particular, these monitor modules 208, which are referred to herein as parametric limit monitor modules 208, are preferably configured to measure the degradation of one or more parametric control limits. Thus, in addition to determining PASS/FAIL status, the health data supplied by parametric limit monitor modules 208 include data representative of, for example, one or more parameters. It will be appreciated that the specific parameters may vary. For example, the parameters may include an input command and the response to that input command. In the context of an actuator or a component moved by an actuator, the parametric control limits of interest may include the upper limit and lower limit of position, the maximum slew rate, the maximum small-signal bandwidth, and the maximum force/torque. The command and response parameters returned by the monitors may include position, rate, current, voltage, and control limits, just to name a few. It will be appreciated that a "PASS" result associated with an input command notionally indicates that the applicable control law may continue issuing those commands, whereas a "FAIL" result notionally indicates that the control law should no longer issue that command. As an example of the latter, if a component were commanded to move at a rate of 20 units/second but moved at only a rate of 10 units/second, a parametric limit monitor module 208 would return a FAIL result, and that 20 units/second was attempted but only 10 units/second was achieved.

The subsystem reasoner 204 receives the health data supplied from the tests function 202 and determines which failure(s) and/or degradation(s) are present and, if degradation is present, determines the degree of degradation. More specifically, the reasoner 204 is coupled to receive the health data and is configured, in response thereto, to selectively indict and clear one or more faults, determine one or more failures that cause indicted faults, and determine, based on the one or more determined failures, a usable range of control effector commands to which the control effector can respond. In some instances, the subsystem reasoner 204 may additionally issue an action to be performed to prevent further damage of a faulty/degraded subsystem or to prevent cascading failures in other subsystems. The manner in which the subsystem reasoner 204 is implemented allows it to handle various diagnostic complexities including, for example, fault ambiguity, latency, false positives, false negatives, and intermittency, just to name a few. Although conceptually one might associate a FAIL result from a particular test with the presence of a particular fault or failure, the reasoner is the final arbiter.

As a means to that end, the subsystem reasoner 204 implements diagnostic inference to compute which faults may be present. Faults are intermediate conclusions in the reasoner 204 that account for the fact that a given failure/degradation can be caused by various underlying causes that produce distinct test evidence. Faults need only be modeled to the extent that they produce different test evidence. For example, a stuck actuator failure can be caused by a mechanical jam fault or a communications fault, and the evidence for these two faults is different.

The subsystem reasoner 204 tracks the health data supplied from the tests module 202, and makes fault determinations based on cumulatively collected results (i.e., cumulative evidence). This is because tracking cumulative results will more accurately reflect subsystem health state rather than an instantaneous result. For non-parametric tests, the cumulative evidence will preferably take on the discrete states, such as, for example: UNKNOWN, PASS, FAIL, FAIL-[qualifier1]/FAIL-[qualifier2]/etc. In addition, the discrete states SOMETIMES-PASS, SOMETIMES-FAIL, SOMETIMES-FAIL-[qualifier] may be used to track the state of tests that are failing intermittently. As may be appreciated, some faults produce such intermittent evidence.

The cumulative evidence based on the health data supplied from the parametric limit monitor modules 208 can take on the discrete states, such as, for example: UNKNOWN, PASS, FAIL, where those discrete states are assigned to ranges of the parameter. For example, the cumulative evidence may indicate that the position monitor PASSes for positions between −30 and +10 units, is UNKNOWN between +10 and +15 units, and FAILs between +15 and +30 units. The reasoner 204 may also assign an overall discrete state to the cumulative evidence from each monitor module 208. The overall state is FAIL if any range of the parameter FAILs. The overall state is UNKNOWN if any range of the parameter is UNKNOWN and no range is FAIL. The overall state is PASS if the entire range of the parameter is PASS. In addition, the discrete states SOMETIMES-PASS, SOMETIMES-FAIL may be used to track the overall state of parametric tests that are failing intermittently.

Before proceeding further, it is noted that, at least generally, a control parameter has a nominal upper limit and a nominal lower limit. Some control parameters are expected to experience only upper limit degradation, others only lower limit degradation, and still others both upper and lower limit degradation. For parametric limit monitor modules 208 where only the upper limit is expected to degrade, the cumulative evidence tracks the UNKNOWN, PASS and FAIL regions of the parameter by tracking the boundary of the values that are known to produce PASS results, and the boundary of the values that are known to produce FAIL results. Between those boundaries, the state is UNKNOWN. PASS results are expected between the lower nominal limit and the PASS boundary. FAIL results are expected between the FAIL boundary and the upper nominal limit. For parametric limit monitors where only the lower limit is expected to degrade, the aforementioned boundaries are reversed. For bidirectional parametric limit monitors, the aforementioned boundaries are tracked for both the upper and lower limits.

In an alternate implementation, the range of the control parameter may be partitioned a priori into fixed segments, and the reasoners cumulative evidence assigns a PASS/FAIL/UNKNOWN state to each individual segment.

The subsystem reasoner 204 associates each parametric control capability that it outputs with at least one parametric monitor that measures it. The subsystem reasoner 204 does not report the degradation of a parametric control capability simply because the associated parametric monitor 208 fails. This is because various faults may cause a monitor module 208 to produce a fail result, perhaps even intermittently, not all of which should be characterized as a degradation of the parametric control capability. Hence, the subsystem reasoner 204 implements diagnostic inference to isolate the problem to an ambiguity group of one or more faults. Once the ambiguity group is reduced such that all faults in the ambiguity group point to a common failure/degradation, the reasoner 204 concludes that the parametric control capability is degraded with the measured value. As an example, assume that a device has upper and lower position limits as a control capability, and that a parametric position limit monitor module 208 observes that the device fails to go to the commanded position. However, rate and bandwidth problems could also cause the position monitor to intermittently fail. In such an instance, the subsystem reasoner 204 will not characterize it as degraded position limits for the controller 109 until it first rules out faults that are characterized as degraded rate or bandwidth limits. For purposes of interfacing to an adaptive controller 109 for automatic fault recovery, the reasoned 204 is designed to report that the control effector 109 is fully capable until it can characterize the problem as a particular failure or degradation. This does not preclude the health management system from reporting early indications of faults for other consumers, such as human operators and maintenance systems.

Figure 3:
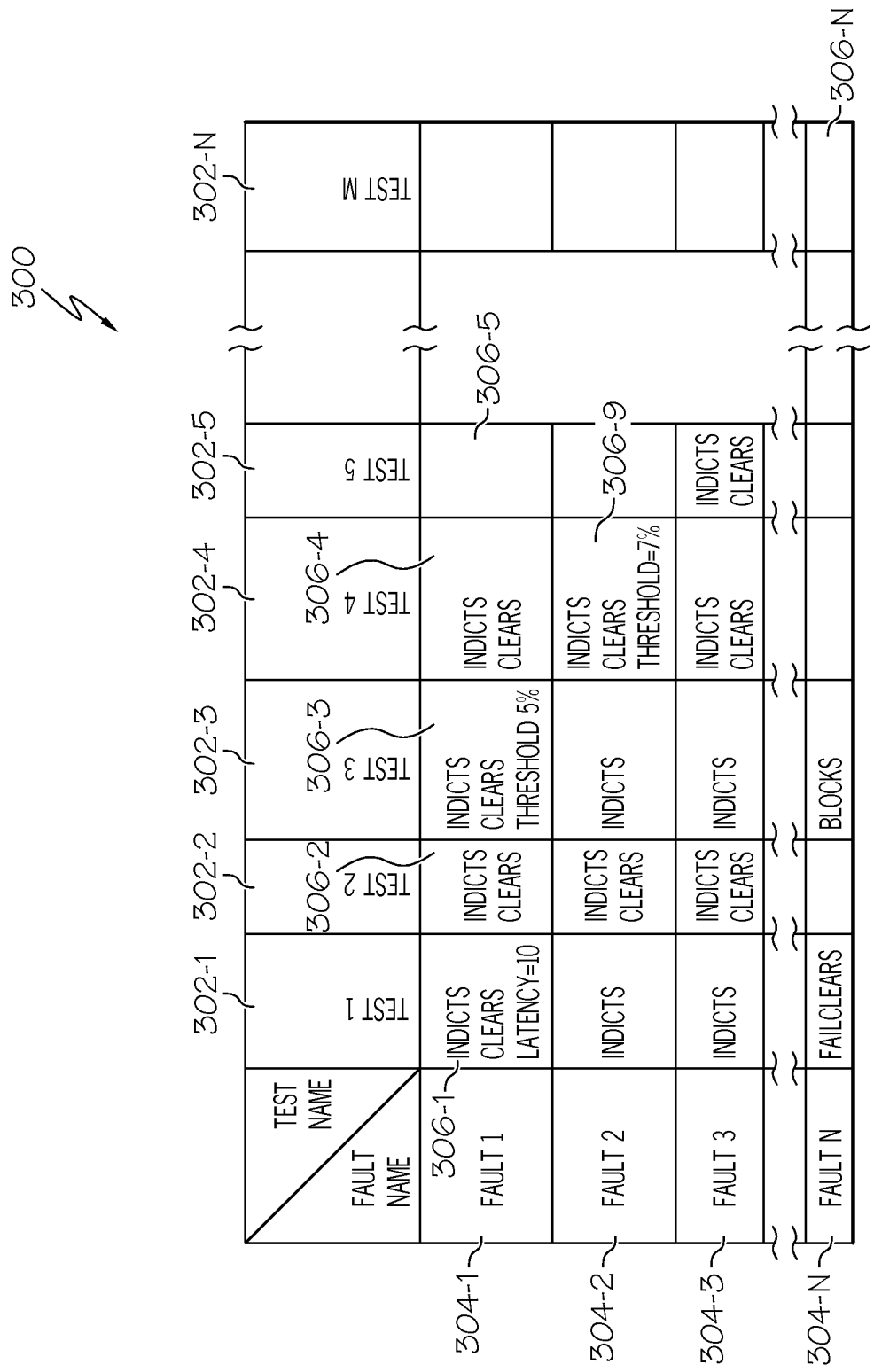
FIG. 3 depicts an example knowledge base of a reasoner, which illustrates a portion of the functionality of the subsystem health management system.
Figure 5:
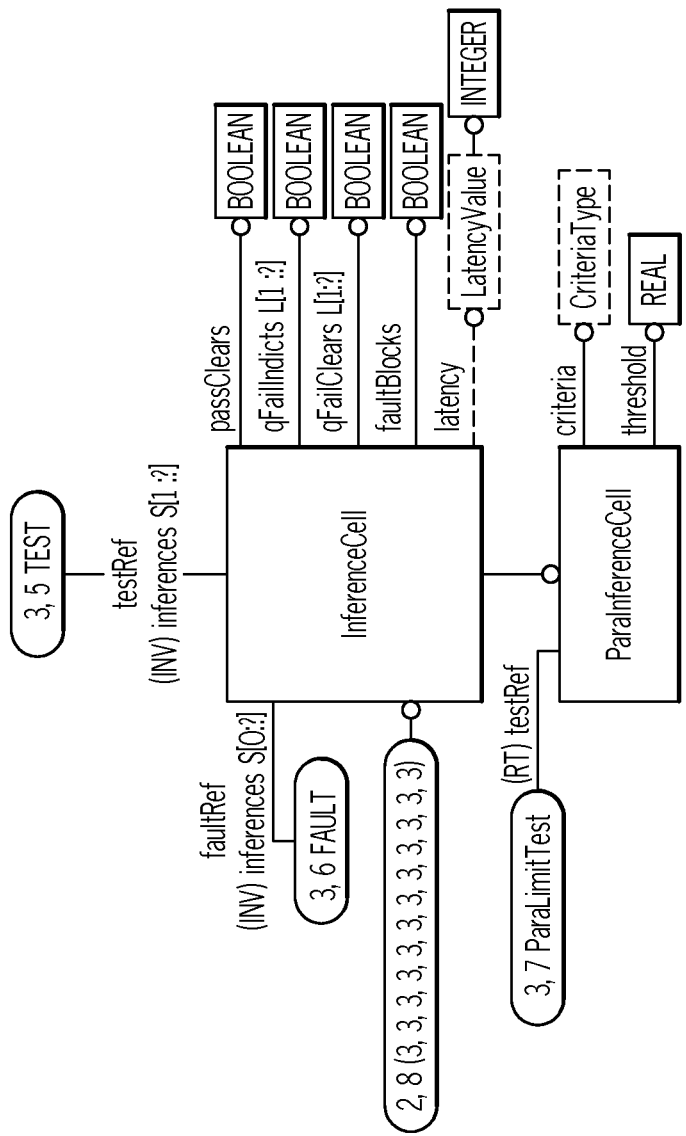
FIGS. 5-8 depict, in the ISO 10303-11 EXPRESS-G format, an information model of the knowledge base of a reasoner that may be used in the subsystem health management system.

To more clearly illustrate how the subsystem reasoner 204 implements the above-described functionality, reference should now be made to FIG. 3, which depicts an example of the knowledge base 300 that the reasoner uses for diagnosis. The knowledge base 300 includes a plurality of columns 302 (302-1, 302-2, 302-3, . . . 302-N), each one of which is associated with a test, and a plurality of rows 304 (304-1, 304-2, 304-3, . . . 304-N), each of which is associated with a particular fault, to thereby form a plurality of what are referred to herein as inference cells 306 (306-1, 306-2, 306-3, . . . 306-N). Reference may also be made to FIG. 5, which depicts an inference cell in the context of an information model schema expressed in the ISO 10303-11 EXPRESS-G format.

Each inference cell 306 represents inference relationships between a particular fault and a particular test. An empty cell indicates there is no inference relationship. The "clears" notation indicates a particular test 302 passing exonerates a particular fault. Conversely the 'indicts' notation indicates a particular test 302 failing calls a particular fault into suspicion. For example, Test 1 will, if it passes, clear only Fault 1, whereas Test 2, if it passes, will clear Fault 1, Fault 2, and Fault 3. However, Test 1 and Test 2 will, upon failure, each indict Fault 1, Fault 2, and Fault 3 as potential suspects. The "failClears" notation indicates that a particular test 302 failing clears a particular fault. The "blocks" notation indicates that the presence of a particular fault would prevent a particular test from properly detecting other faults. A "latency" number indicates an upper time bound for a fault to propagate to a particular test, such that the reasoner should allow the specified latency to expire before the test passing can clear the fault. A "threshold" number indicates that a fault may be cleared if the degradation of the parameter measured by the test does not meet the threshold.

Figure 6:
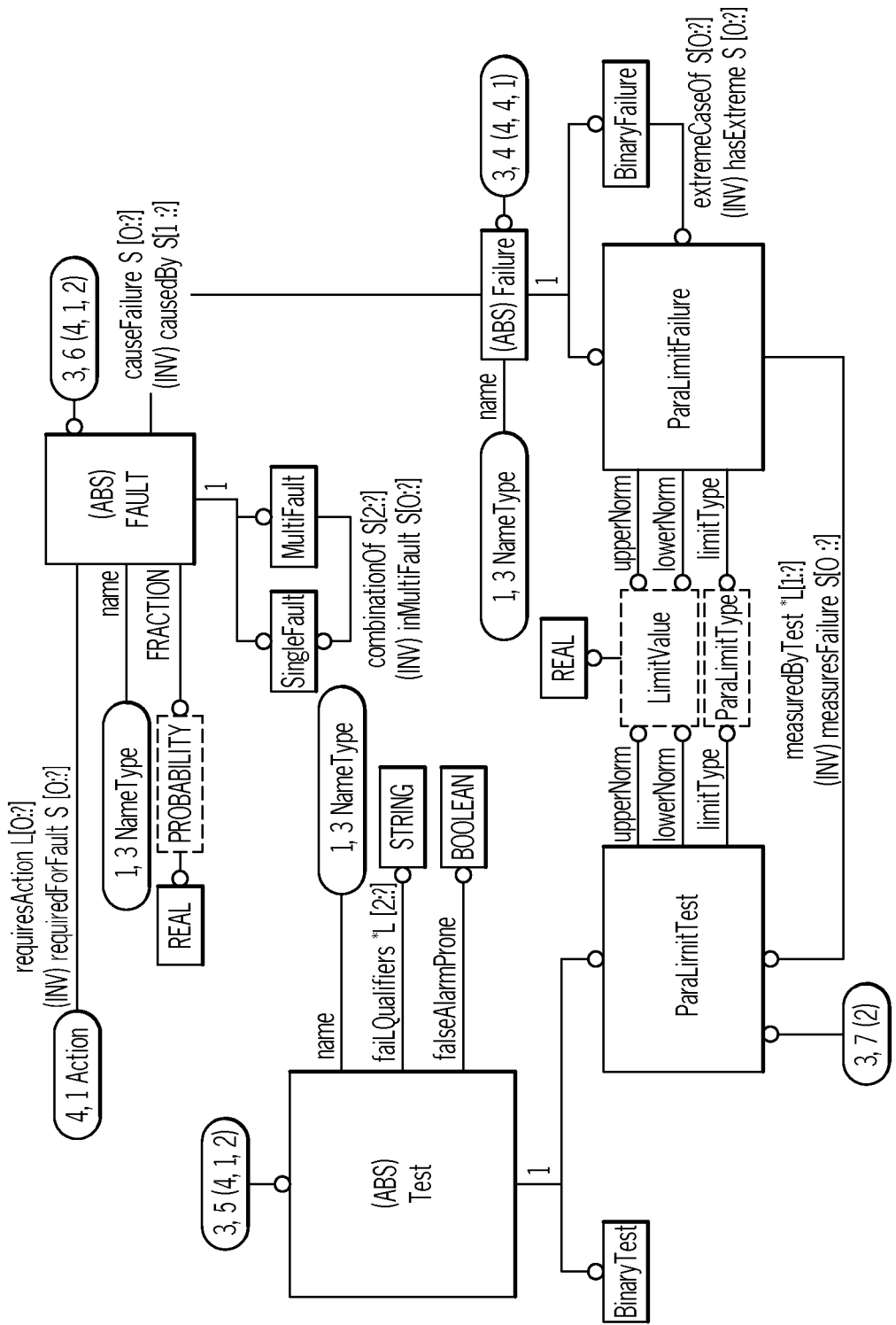
Figure 7:
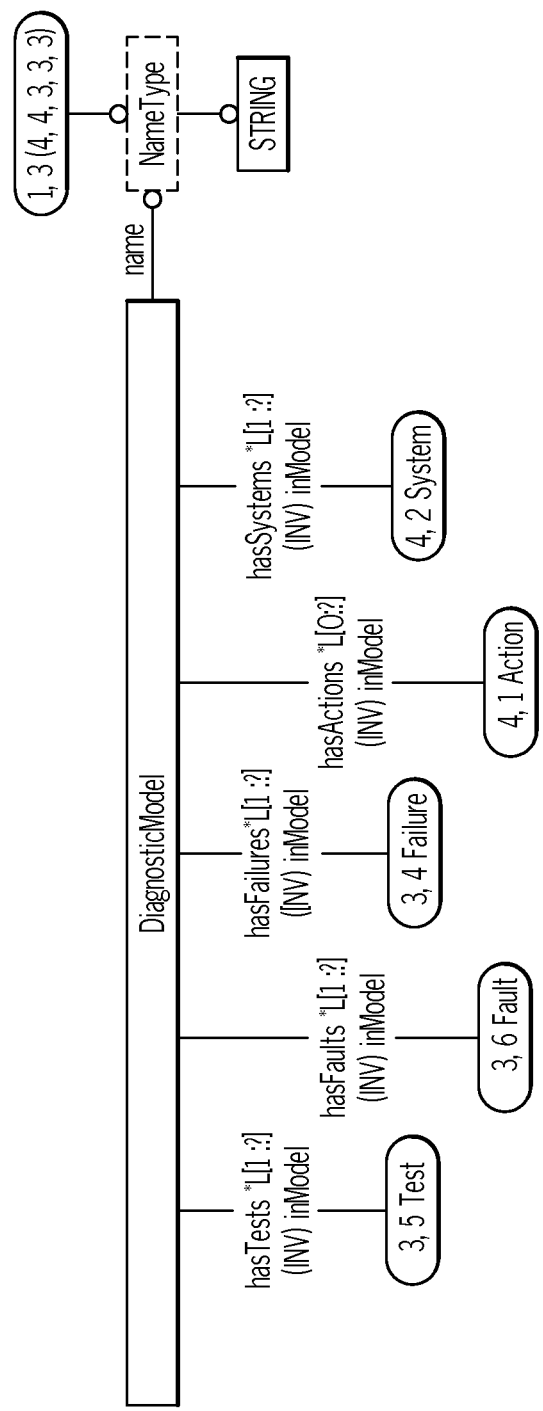
Figure 8:
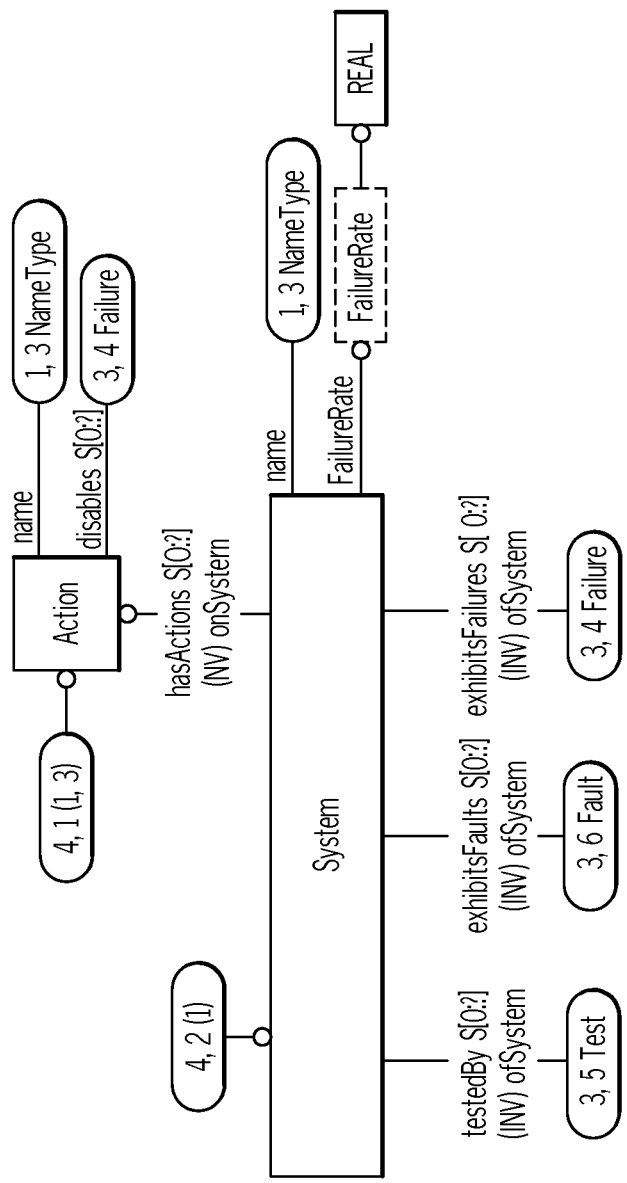

Hence, throughout operation of the subsystem health management system 104, the subsystem reasoner 204 is receiving health data from the tests module 202 and, based on these health data, is continuously clearing and indicting faults. The subsystem reasoner 204 additionally includes data that associates each fault (or various combinations of faults) with zero or more failures. The subsystem reasoner 204, based on the faults that are indicted by each of the tests, determines whether one or more failures are present. The failures are also preferably categorized as either "binary" failures or "parametric" failures. A binary failure is a failure that represents the complete loss of an effector capability. Conversely, a parametric failure represents a degradation of an effector capability. Thus, a parametric failure will also provide additional information to quantify the degradation in terms of new limits to an effector capability. It is noted that the functionality described in this paragraph is depicted in the information model schema depicted in FIG. 6.

The list of faults in FIG. 3 may include some faults that are physically external to the effector, because such faults can nevertheless impact the capability of the effector. By way of example, a fault in the power and distribution system that feeds an effector could result in a "float" failure of the effector. Similarly the list of tests in FIG. 3 may include some tests that primarily verify the health of systems outside of the physical effector, as indict or clear said external faults that impact the capability of the effector.

A combination of binary and parametric failures may be used for discrete effectors (those that receive discrete commands) and for continuous effectors (those that receive continuously variable commands). The choice of failures is driven in part by what the adaptive control system can respond to. By way of example, a discrete effector, such as an On/Off thruster rocket, can have binary failures such as "stuck on" and "stuck off" as well as parametric failures such as "degraded bandwidth", "degraded duty cycle", "degraded maximum time on", "degraded minimum time on" and "degraded minimum time off". A continuous effector, such as an aerodynamic control surface, can have binary failures such as "stuck" and "floating" as well as parametric failures such as "degraded position limits", "degraded rate limits", "degraded bandwidth limits" and "degraded load limits".

Figure 4:
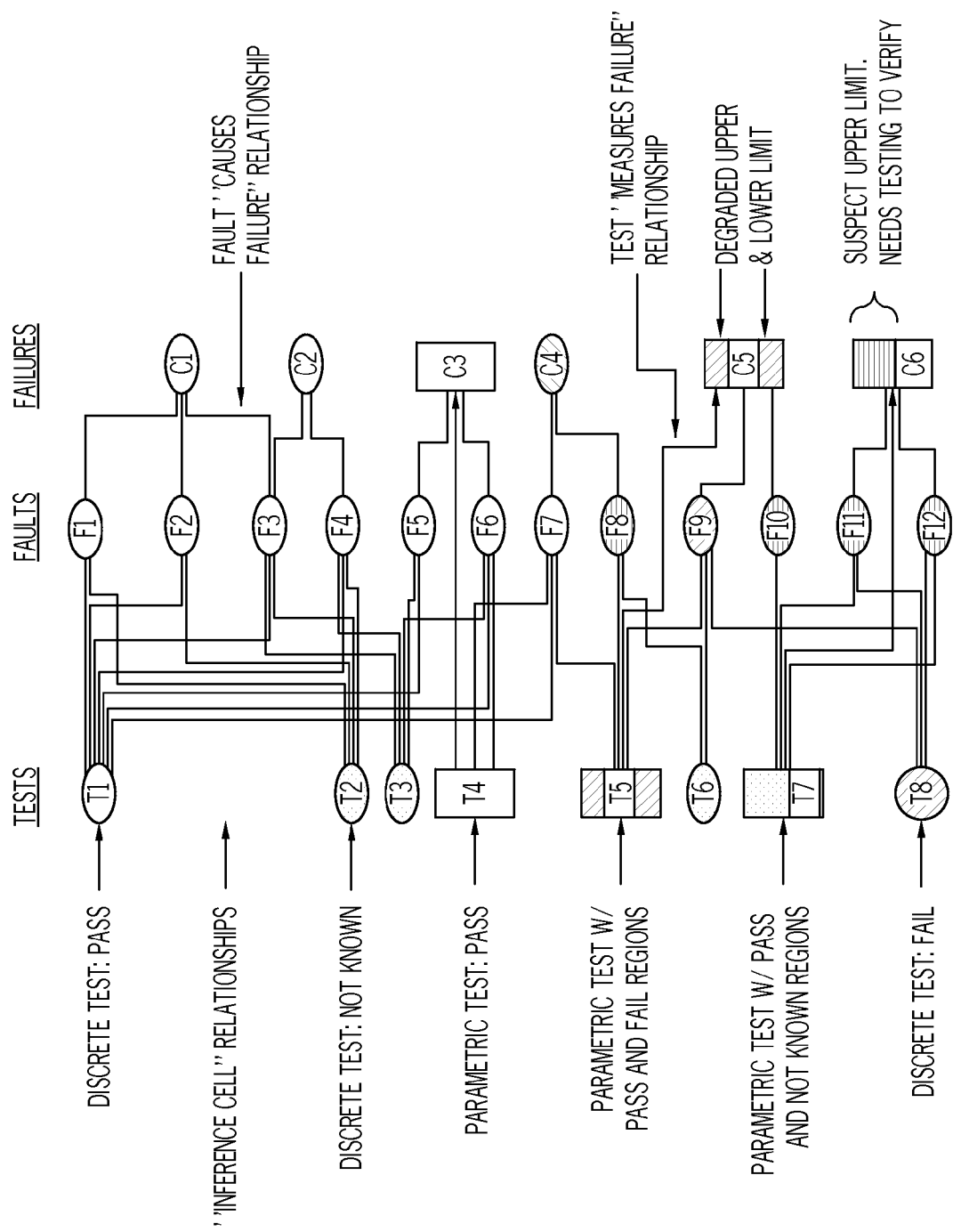
FIG. 4 graphically depicts a simplified representation of the overall functionality of the subsystem health management system.

A simplified representation of the overall functionality of the subsystem health management system 104 is depicted in FIG. 4, and should now be referenced. This figure graphically depicts three columns—a Test column 402, a Faults column 404, and a Failures column 406. The schema that is used depicts binary tests, binary faults, and binary failures with ellipses, and depicts parametric tests, and parametric failures with rectangles. It is noted that the vertical sides of each rectangle represent the parametric value resultant associated with that particular parametric test. As seen, Test T4 indicates that this test passes throughout its entire range. Thus, Test 4 clears Faults F6 and F7, and also clears Failure C3 throughout its entire range. Moreover, Failure C3 has been cleared by Test T1, which cleared Faults F1-F7.

Conversely, Test T5 is shown to be failing in both the upper and lower portions of the range, and thereby indicts Faults F7, F8, and F9. Moreover, because Fault F9 is also indicted by Test T8 (and is neither cleared nor indicted by Test T6), then Failure C5 is indicted as having degraded upper and lower limits. For completeness, it is noted that the results of Tests T2, T3, and T6 are not known, and Test T7 is a pass with an unknown upper limit region. As a result, Faults F8, F10, F11, and F12, and Failures C4 and a portion of C6, are depicted as neither cleared nor indicted, which means these Failures and Faults are suspect or, in the case of Failure C6, partially suspect.

Certain faults require immediate actions to prevent further harm to the vehicle 110. The subsystem reasoner 204 supplies commands, as needed, based on the isolated faults. Some actions have the effect of removing capability, and the subsystem reasoner 204 supplies the lost/degraded capabilities to the control law.

The subsystem reasoner 204 implements a knowledge base to compute its conclusions. An information model of the knowledge base is depicted in FIGS. 5-8 in the ISO 10303-11 EXPRESS-G format. As may be appreciated, the data that are supplied to the depicted information model will be transformed to structures that are dependent on the software implementation language and real-time execution.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A method for determining the response capabilities of a control effector, the method comprising the steps of:
    processing, in a test module, at least command data and sensor data associated with the control effector to generate control effector health data representative of control effector health; and
    processing the control effector health data in a reasoner to:
    (i) selectively indict and clear one or more faults,
    (ii) determine one or more failures caused by indicted faults, and
    (iii) determine, based on the one or more determined failures, a usable range of control effector commands to control the control effector with the usable range of commands.

2. The method of claim 1, further comprising:
    supplying the usable range data to an adaptive control system.

3. The method of claim 1, wherein the one or more failures include one or more binary failures and one or more parametric failures.

4. The method of claim 1, further comprising determining the quantitative degradation of each of the one or more parametric failures.

5. The method of claim 1, further comprising:
    generating one or more action alerts, each action alert representative of an action to be performed.

6. A system for determining the response capabilities of a control effector, comprising:
    a test module adapted to receive at least command data and sensor data associated with a control effector, the test module configured, upon receipt of these data, to generate control effector health data representative of control effector health; and
    a reasoner coupled to receive the control effector health data and configured, in response thereto, to (i) selectively indict and clear one or more faults, (ii) determine one or more failures caused by indicted faults, and (iii) determine, based on the one or more determined failures, a usable range of control effector commands to control the control effector with the usable range of commands.

7. The system of claim 6, wherein the reasoner is further configured to:
    supply the usable range data to an adaptive control system.

8. The system of claim 6, wherein the one or more failures include one or more binary failures and one or more parametric failures.

9. The system of claim 6, wherein the reasoned is further configured to determine the quantitative degradation of each of the one or more parametric failures.

10. The system of claim 6, wherein the reasoned is further configured to generate one or more action alerts, each action alert representative of an action to be performed.

* * * * *